United States Patent [19]

Biverstedt

[11] Patent Number: 4,762,573
[45] Date of Patent: Aug. 9, 1988

[54] FLUXING AGENT AND SOLDERING PROCESS

[75] Inventor: Arne Biverstedt, Tullinge, Sweden

[73] Assignee: Ytkemiska Institutet, Stockholm, Sweden

[21] Appl. No.: 853,812

[22] PCT Filed: Jul. 22, 1985

[86] PCT No.: PCT/SE85/00291

§ 371 Date: Mar. 18, 1986

§ 102(e) Date: Mar. 18, 1986

[87] PCT Pub. No.: WO86/00844

PCT Pub. Date: Feb. 13, 1986

[30] Foreign Application Priority Data

Jul. 20, 1984 [SE] Sweden ............................ 8403815-7

[51] Int. Cl.$^4$ ............................................. B23K 35/34
[52] U.S. Cl. ........................................ 148/23; 148/24; 148/25; 228/223; 228/224
[58] Field of Search ............................ 228/223, 224; 148/23-25

[56] References Cited

U.S. PATENT DOCUMENTS

| | | | |
|---|---|---|---|
| 4,077,815 | 3/1978 | Schuessler | 148/23 |
| 4,151,015 | 4/1979 | Cooper | 148/23 |
| 4,168,996 | 9/1979 | Zado | 148/23 |
| 4,342,607 | 8/1982 | Zado | 148/23 |
| 4,523,712 | 6/1985 | Zado | 148/23 |
| 4,561,913 | 12/1985 | Zado | 148/23 |

*Primary Examiner*—Peter D. Rosenberg
*Attorney, Agent, or Firm*—Ralph H. Dougherty

[57] ABSTRACT

A fluxing agent for soldering, e.g. of electronic components, characterized by consisting of a solution comprising 1-15, preferably 2-12% by weight of nonionic surface active agent and/or another substance with similar capacity to form liquid crystals in the fluxing agent film, 1-80, preferably 1-10% by weight of water, and volatile solvent, preferably at least 70% by weight, and minor quantities of activators which are capable of reacting with impurities on the surfaces subjected to soldering, such as halides and carboxylic acids, and preferably with a weight ratio of nonionic surface active agent to water of 1:8 to 5:1 and especially 0.5:1 to 2:1, and a process for soldering using said fluxing agent.

16 Claims, No Drawings

FLUXING AGENT AND SOLDERING PROCESS

This invention is related to a fluxing agent for soldering e.g. electronic components and a process for soldering using said fluxing agent.

When soldering with a solder based preferably on tin and tin alloys a fluxing agent is conventionally used, which improves the contact of the solder with the surfaces intended to be soldered and bonding to said surfaces, especially surfaces of such metals as copper, brass, iron, etc. Examples of such conventional fluxing agents are water-based fluxing agents and resin-based fluxing agents. The main purpose of such fluxing agents is to remove the oxide layer and to improve spreading on the surface, and they usually comprise (1) an acid cleaving agent, (2) an organic acid, (3) a carrier, (4) solvent and (5) a tenside.

Examples of literature discussing fluxing agents are:
(a) *The chemistry and behaviour of Fluxes* W. Rubin and B.M. Allen, Multicore Solders Ltd., Hemel, Hempstead, Hearts.
(b) *A Flux for all reasons* C. J. McGougon, Electronic Production, October, 1980.
(c) *Flux choices soldering printed* A. F. Schneider, Electronic Packing and Production, July, 1980, 89.
(d) U.S. Pat. No. 3,746,620
(e) U.S. Pat. No. 4,077,815
(f) GB Pat. No. 2,086,944
(g) DE Auslegeschrift No. 1,483,464
(h) DE Auslegeschrift No. 1,608,425
(i) SE Published Application No. 331,412
(k) SE Published Application No. 331,783.

The fluxing agent according to the invention is distinguished from these conventional fluxing agents and is based on a combination of nonionic surface active agent and/or another substance with similar capacity to form liquid crystals together with at least the main part of the other constituents of the fluxing agent, at least after evaporating at least 50%, at least 80%, at least 95% or at least 98% of the volatile solvent, and water and for a satisfactory soldering effect suitable quantities of so-called activators capable of reacting with impurities on the surfaces intended for soldering, e.g. halides and carboxylic acids. The fluxing agent comprises also volatile solvent, preferably as a main constituent and frequently in a quantity of at least 80% by weight. The contents of nonionic surface active agent (and/or another substance with similar capacity to form liquid crystals, as mentioned above) and water and the remaining constituents are preferably selected so that the fluxing agent after application on a surface and evaporating the volatile solvent to at least 50% and preferably to at least 80% or 90% by weight comprises the remaining constituents dissolved in the mixture of surface active agent (and/or another substance with similar capacity to form liquid crystals) and water or with the formation of liquid crystals in the fluxing agent film remaining after evaporating the solvent.

The contents of the main constituents nonionic surface active agent (and/or another substance with similar capacity to form liquid crystals), water and volatile, especially organic, solvent are suitably at least 0.5% by weight, preferably at least 1% by weight, at least 2% by weight or at least 5% by weight, and preferably at most 20% by weight, especially at most 15% by weight or at most 12% by weight nonionic surface active agent (and/or another substance with similar liquid crystal forming activity), at least 0.5% by weight, preferably at least 1% by weight, at least 2% by weight or at least 5% by weight water and preferably at most 80%, especially at most 50% at most 20%, at most 15% or at most 10% by weight water and balance mainly volatile solvent, preferably in a quantity of at least 50%, especially at least 80% or at least 90% by weight, said weight percentage figures being based on the total weight of the fluxing agent or optionally on the weight of the three main constituents nonionic surface active agent (and/or another substance with similar liquid crystal forming activity), water and volatile solvent. Furthermore, it is important that the ratio of nonionic surface active agent (and/or another substance with similar liquid crystal forming activity): water is preferably at least 1:8, suitably at least 0.5:1 or at least 0.75:1, and suitably at most 5:1, especially at most 2:1 or at most 1.5:1. A suitable value of said ratio is frequently about 1.

Examples of suitable nonionic surface active agents are mono or dialkylphenol ethylene oxide and/or propylene oxide adducts, preferably mono or di-$C_3$-$C_{18}$ alkylphenol-2-150-EO/PO (i.e. alkylphenol ethylene oxide/propylene oxide adducts comprising 2-150 ethylene oxide units and/or propylene oxide units). A suitable number of ethylene oxide and/or propylene oxide units per alkylphenol molecule is e.g. at least 2, at least 4 or at least 8 such units, e.g. 5 or 10 units. Suitable limits may be at most 80, at most 60 or at most 50 alkylene oxide units per molecule. As examples may be mentioned $C_5$-$C_{12}$ alkylphenol-5-80-EO/PO, nonylphenol-5-80-EO, dinonylphenol-5-80-EO, and, furthermore, alkanol-EO/PO adducts, preferably $C_5$-$C_{22}$ alkanol-5-80-EO/PO, e.g. 10-50EO/PO units. Also other nonionic surface active agents can be used if they fulfil the requests stated above, which can easily be determined by a person skilled in the art with routine tests.

In general, tensides of the type phenol ethylene oxide(EO)propylene oxide(PO) adducts, e.g. alkylphenol or dialkyl-phenol-EO,PO adducts, especially nonyl or dinonylphenol-EO,PO adducts, make the finished, dried fluxing agent film stiffer, compared with tensides of the type alcohol-EO,PO adducts. Therefore it is preferable to balance the contents of said two types of tenside against each other in order to combine toughness with strength, preferably to a ratio of phenol-EO,PO to alcohol-EO,PO of 1:0.5-6, especially 1:1-5 or 1:2-4. Phenol-EO,PO in this connection is intended to comprise also the alkylphenol-EO,PO adducts mentioned above. Frequently it is suitable to include phenol-EO,PO adducts with a short EO,PO chain, e.g. 2-20 EO,PO, 2-10 EO,PO or 2-6 EO,PO, especially in combination with alcohol-EO,PO adducts as mentioned above.

The meaning of the expression "liquid crystal" is discussed below. In addition to nonionic surface active agents, especially those mentioned here, also e.g. polyols are suited, e.g. polyols of block polymers of ethylene oxide and/or propylene oxide, preferably with extensively branched chains, e.g. such substances which are used as flocculating agents. Suitable molar weights of said polyols (polymers) may amount to at least 500, at least 1000 or at least 2000, and up to preferably at most 50,000, e.g. at most 30,000, at most 20,000 or at most 10,000. The nonionic surface active agents and polyols, especially the block polymers of ethylene oxide and/or propylene oxide, mentioned herein may optionally be used also in case the formation of liquid crystals cannot be observed.

The liquid solvent consists preferably of a liquid organic solvent and should preferably to at least 20%, preferably at least 50% or at least 90%, based on the weight of the solvent, consist of one or more alcohols, preferably monoalcohols, e.g. alkanols, ethers, esters, ketones, halogenated hydrocarbons or hydrocarbons, e.g. alkanes, with a boiling point of at least 40° C., preferably at least 60° C., and preferably at most 140° C., at most 120° C. or at most 100° C., especially propanol and preferably 2-propanol but also 1-propanol, ethanol, methanol. The solvent should maintain the other constituents in solution to preferably at least 80 or 90% of the weight and especially to 100% of the weight of said other constituents so that a clear solution thereof is formed. Preferably the solvent to at least 95%, at least 99% or at least 100% consists of substances with boiling points within the range stated above, especially alkanols.

Furthermore, the fluxing agent comprises active constituents or so-called activators, especially halogen releasing components, especially chlorine or bromine containing compounds which are capable of releasing bonded chlorine or bromine at the temperature used for soldering. As such activators one may use those conventionally used in fluxing agents intended for soldering, such as aminohydrochloride or bromide, e.g. piperidine hydrochloride, methylamine hydrochloride, triethanolamine hydrochloride, semicarbazide hydrochloride, dimethylaminemalonate hydrochloride, 2-chloro-1-dimethylaminopropane hydrochloride, 2-bromoethylamine hydrochloride, trimethylamine hydrochloride, 2-diethylamineethylchloride hydrochloride, 3-dimethylamine-1-propylchloride hydrochloride, triethylamine hydrochloride, piperidine hydrochloride, dimethylamine hydrochloride, aminomalonic acid dimethylester-HCl, 2-aminoethylbromide-HBr, glutaminic acid-HCl, dimethylamine-HCl, glucoseamine-HCl, guanidine-HCl, methylamine hydrochloride or mixtures thereof, carboxylic acids, such as mono, di, tri or polycarboxylic acids, e.g. $C_1$–$C_9$ carboxylic acids, e.g. tartaric acid, succinic acid, malic acid, maleinic acid, oxalic acid, fumaric acid, glutaric acid, adipinic acid, pimelinic acid, phthalic acid, azelainic acid, citric acid, malonic acid, glutaminic acid, succinimide or mixtures thereof.

Preferably the quantity of HCl and/or HBr available for reaction with the surface is at most 1.5 g/l and especially at most 1 g/l or at most 0.5 g/l, based on the fluxing agent used for application on the metal surface or optionally said fluxing agent after evaporation of the volatile solvent. A suitable lower limit of the contents of available HCl and/or HBr is at least 0.01, at least 0.1 or at least 0.2 g/l, based on the whole fluxing agent, optionally with exception of the volatile solvent.

When using the fluxing agent according to the invention said agent is applied as a solution on the surface intended for soldering, e.g. a circuit board. The fluxing agent can be applied in a conventional manner, e.g. spraying or casting or with application rolls or by immersing, e.g. in an application station onto articles which are fed continuously or intermittently and which preferably immediately thereafter are heated for evaporating the solvent and preferably also for soldering.

The film thickness with which the fluxing agent is applied depends on the composition and the type of soldered article. For e.g. circuit boards a film thickness of at least 5 microns and preferably at least 10 microns or at least 20 microns in the application state or at least 0.1 micron, preferably at least 0.5 micron, at least 1 micron or at least 5 microns after evaporating the volatile solvent, preferably in a quantity of at least 50%, at least 80% or at least 90%, is suitable. An upper limit of the film thickness may be at most 200 microns, preferably at most 100 microns, at most 50 microns or at most 25 microns prior to removing the volatile solvent and e.g. at most 50 microns, at most 25 microns, at most 10 microns or at most 5 microns after evaporating the volatile solvent to any of the content levels mentioned above.

The solvent is preferably evaporated at temperatures at which the dissolved constituents, especially the dissolved activators, form liquid crystals together with the nonionic tenside (and/or another substance with similar capacity to form liquid crystals) and remaining water and optionally remaining content of volatile solvent. As regards the meaning of the expression "liquid crystals" reference can be made to the publication "Liquid Crystals and Oriented Fluids" by Julian F. Johnsson and Roger S. Porter, Plenum Press, Vol. 1, 1969 and Vol. 2, 1973. The liquid crystals are usually composed of lamella of an aqueous solution of the constituents of the fluxing agent and tenside in the shape of alternating layers, e.g. with a thickness ratio of the aqueous solution layer to the tenside layer of 5:1 to 1:5. Preferably at least 50%, especially at least 80% or at least 95% to 100% of the constituents of the fluxing agent, apart from the volatile solvent, are dissolved in the aqueous phase in the liquid crystals. A temperature which is suited for the heating of the applied fluxing agent for evaporating the solvent may be at least 40° C., at least 50° C., at least 70° C., at least 80° C. or at least 90° C. A suitable upper limit of the temperature may be a temperature of at most 140° C., preferably at most 120° C., at most 100° C. or at most 90° C.

After evaporating the solvent to a suitable extent, completely or partly, heating is performed to a suitable soldering temperature, and said heating can be performed separate from the heating for evaporating the solvent or simultaneously with said heating or as a heating step directly connected thereto. The suitable soldering temperatures depend on the solder material used and the article subjected to soldering, and basically conventionally used temperatures can be used, e.g. 150°–400° C., usually about 250° C. Soldering can be performed in a conventional apparatus, e.g. by dipping into a solder bath or contacting or flooding with a flow of molten solder material, preferably against the lower side of the article, e.g. the lower side of a circuit board.

Below a number of examples are given of fluxing agents which are suited for soldering of e.g. copper surfaces, e.g. in the shape of circuit boards, brass surfaces, etc.

The fluxing agents according to Examples 1–5 were applied to the surface of the soldered articles e.g. with a foam wave in soldering apparatuses for e.g. wave soldering and drag soldering.

EXAMPLE 1

2.0 g malic acid
1.0 g methylamine hydrochloride
50.0 g dinonylphenol-16 EO(ethyleneoxide) adduct
50.0 g deionized water balance to 1000 ml 2-propanol.

EXAMPLE 2

A fluxing agent according to the invention was prepared, containing 2.0 g tartaric acid
1.7 g piperidine hydrochloride
20.0 g nonylphenol ethyleneoxide adduct, EO=10
40.0 g alcohol ethyleneoxide adduct ($C_{16}$–$C_{18}$ alcohol, EO=30)
60.0 g water balance to 1000 ml 2-propanol.

EXAMPLE 3

A fluxing agent composition was prepared from
1.5 g citric acid
1.5 g triethanolamine hydrochloride
50.0 g nonylphenol ethyleneoxide adduct, EO=50
60.0 g deionized water balance to 1000 ml 2-propanol

EXAMPLE 4

A fluxing agent was prepared, comprising
2.0 g piperidine hydrochloride
2.0 g tartaric acid
40.0 g nonylphenol ethyleneoxide adduct, EO=10
80.0 g alcohol ethyleneoxide adduct, $C_{16}$–$C_{18}$ alcohol, EO=30
480 g deionized water balance to 1000 ml 2-propanol.

EXAMPLE 5

A fluxing agent was prepared, comprising
2.0 g piperidine hydrochloride
2.0 g tartaric acid
40.0 g nonylphenol ethyleneoxide adduct, EO=2
60.0 g alkanol ethyleneoxide adduct, $C_{16}$–$C_{18}$ alkanol, EO=30
60.0 g deionized water balance to 1000 ml 2-propanol.

The fluxing agent according to Example 5 can be washed away with such organic solvents as e.g. freon-/ethanol or trichlorethylene. Experiments with the use of said two solvents for washing various soldered products, such as circuit boards with copper foil, gave good results.

The fluxing agent compositions according to Examples 1–5 were used for experiments comprising soldering of monolayer and multilayer circuit boards with copper foil. A conventional soldering apparatus was used. Application of the fluxing agent was performed with foam wave with wiper brushes so that a fluxing agent film of desired thickness was obtained. The fluxing agent was thereafter pre-dried so that the alcohol was evaporated at a temperature of about 90° C. After drying the film the coated articles were transferred to the soldering station (the solder bath), and were heated to the temperature required for soldering. It was revealed that the speed of the soldering apparatus could be increased from the conventional speed of about 0.7–1.0 m/minute to a speed of 3–4 m/minute, and also that a more intense preheating, to about 150°–200° C., was desirable in order to make it possible to evaporate the solvent and to dry the film to the required extent. The most desirable results were obtained with a so-called pulsing IR drier (infrared drier).

Soldering was performed with solder comprising 60% lead, 40% tin and 40% lead, 60% tin.

After the soldering treatment remaining fluxing agent components were removed by rinsing with water, and by rinsing with freon/ethanol and with trichlorethylene resp. for the fluxing agent according to Example 5. Very favourable results were obtained in said experiments with good spread of solder and good bonding and very slight attack on the soldered surfaces.

Together with the substances mentioned above it is possible to use other constituents which do not interfere with the application of the fluxing agent film or the formation of liquid crystals mentioned above.

The content of polyglycols (polyethylene glycol, etc.) (among which are not included the polyols mentioned above, especially block polymers of ethylene oxide and/or propylene oxide, preferably with the capacity of forming liquid crystals) should be restricted to less than 10%, preferably less than 5% or less than 1% or optionally less than 0.1%, based on the total quantity of fluxing agent or on the fluxing agent without the volatile solvent.

The content of fats and oils frequently used in conventional fluxing agents should be restricted to less than 10% by weight, preferably less than 5%, especially less than 1% or less than 0.1%, based on the weight of the total fluxing agent or the fluxing agent without the volatile solvent.

The content of glycerol and/or similar multivalent alcohols should suitably be restricted to less than 10%, preferably at most 5% or at most 1% or at most 0.1%, based on the weight of the total fluxing agent or the fluxing agent without the volatile solvent.

The contents of other conventional carriers should suitably be restricted to at most 10%, preferably at most 5% or at most 1% or optionally at most 0.1%, based on the weight of the total fluxing agent or the fluxing agent without the volatile solvent. Said conventional carriers may consist of e.g. polyvinyl alcohols, polyvinyl pyrrolidone and similar substances.

The contents of anion active and cation active tensides are suitably restricted to at most 20%, at most 10%, preferably at most 5% or at most 1%, based on the weight of nonion active tenside and/or another mentioned constituent with capacity to form, in a similar manner, liquid crystals in the fluxing agent film.

I claim:

1. A fluxing agent for soldering consisting of a solution, comprising:
   from 1 to 15 percent by weight of a non-ionic substance selected from the group consisting of non-ionic surface active agents and substances with capacity to form liquid crystals in a film of the fluxing agent and mixtures thereof;
   from 1 to 50 percent by weight of water; and
   at least 20% by weight of a volatile organic solvent, and minor quantities of soldering activators which are capable of reacting with impurities on metal surfaces subjected to soldering;
   the weight ratio of said non-ionic substance to water being from 1:8 to 5:1, and said non-ionic substance being soluble in the mixture of water and volatile organic solvent.

2. A fluxing agent according to claim 1 wherein said non-ionic substance is selected from the group consisting of mono and dialkylphenol ethylene oxide and propylene oxide and mixed ethylene oxide-propylene oxide adducts and alkanol-ethylene oxide and -propylene oxide and mixed ethylene oxide-propylene oxide adducts.

3. A fluxing agent according to claim 2 in which the non-ionic substance is a surface active agent selected form the group consisting of mon and di-$C_3$–$D_{18}$ alkylphenol-2-150 EO/PO and $C_5$–$C_{22}$ alkanol-2-80 EO/PO.

4. A fluxing agent according to claim 3 in which the non-ionic surface active agent is selected from the group consisting of mono and di-$C_5$–$C_{12}$ alkylphenol-5-80 EP/PO.

5. A fluxing agent according to claim 4 in which the non-ionic surface active agent is selected from the group consisting of nonylphenol-5-80 EO and dinonylphenol-5-80 EO.

6. A fluxing agent according to claim 2 in which at least 70% of the weight of said volatile organic solvent consists of a substance selected from the group consisting of alkanols, hydrocarbons, and mixtures thereof, with a boiling point within the range of 40° to 120° C.

7. A fluxing agent according to claim 2 in which the content of the volatile solvent amounts to at least 50% of the weight of the fluxing agent.

8. A fluxing agent according to claim 7 in which the volatile solvent is at least 70% of the weight of the fluxing agent and consists of 2-propanol.

9. A fluxing agent according to claim 2 further comprising an activator selected from the group consisting of amino hydrochlorides, amino hydrobromides and mono, di, tri and poly-carboxylic acids.

10. A fluxing agent according to claim 2 in which the weight ratio of the non-ionic substance to the water is from 0.5:1 to 2:1.

11. A fluxing agent according to claim 2 applied onto a metal surface for soldering as a film which, after evaporation of the volatile solvent, has a thickness of from 0.25 to 25 microns.

12. A soldering process, characterized by applying on the surfaces intended for soldering, prior to the soldering, a fluxing agent according to claim 1 and heating said surfaces with said fluxing agent to vaporize the solvent thereof, especially 2-propanol, followed by heating to the temperature required for soldering.

13. A process according to claim 12, characterized by applying the fluxing agent with a film thickness of 5-200 microns and especially 10-100 microns in the application state, and/or 0.5-25 microns, preferably 1-10 microns, after vaporizing 20%, 50%, 90% or 100% of the volatile organic solvent.

14. A process according to claim 12, characterized by vaporizing at least 20%, preferably at least 50% or at least 90% of the volatile organic solvent before or during the soldering treatment at a temperature, preferably 90°-120° C., such that the dissolved activators form liquid crystals together with the nonionic tenside.

15. A process according to claim 12, characterized by soldering surfaces of iron, copper, nickel, zinc or alloys of one or more of said metals, e.g. brass, preferably electric components, such as printed circuits and similar articles.

16. A process according to claim 12, characterized by using a fluxing agent in which the constituents form a clear solution prior to or optionally after evaporation of the solvent.

* * * * *